US008811341B2

(12) United States Patent
Suzuki et al.

(10) Patent No.: US 8,811,341 B2
(45) Date of Patent: Aug. 19, 2014

(54) RELEASING TIME DOMAIN MEASUREMENT RESTRICTIONS

(75) Inventors: Takashi Suzuki, Ichikawa (JP); Zhijun Cai, Euless, TX (US); Rene Waraputra Purnadi, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 289 days.

(21) Appl. No.: 13/208,991

(22) Filed: Aug. 12, 2011

(65) Prior Publication Data

US 2013/0039338 A1 Feb. 14, 2013

(51) Int. Cl.
*H04W 4/00* (2009.01)
*H04W 36/00* (2009.01)
*H04W 36/38* (2009.01)

(52) U.S. Cl.
CPC .......... *H04W 36/0094* (2013.01); *H04W 36/38* (2013.01)
USPC ........................................................ 370/331

(58) Field of Classification Search
None
See application file for complete search history.

(56) References Cited

U.S. PATENT DOCUMENTS

| | | | |
|---|---|---|---|
| 2008/0305799 A1* | 12/2008 | Zuniga et al. ................. | 455/437 |
| 2009/0191874 A1* | 7/2009 | Du et al. ........................ | 455/436 |
| 2012/0157082 A1* | 6/2012 | Pedersen et al. ............. | 455/422.1 |
| 2012/0302245 A1* | 11/2012 | Huang .......................... | 455/438 |

FOREIGN PATENT DOCUMENTS

WO WO/2011/134239 * 3/2011 ............ H04W 36/00

OTHER PUBLICATIONS

Alcatel-Lucent; "Capturing Intra-Frequency Neighbouring Cell Measurement Restriction"; 3GPP TSG-RAN WG2 Meeting #73bis (R2-112236); Shanghai, China; Apr. 11-15, 2011; 2 pages.
ETSI TS 136 331 V10.2.0 (Jul. 2001); "LTE; Evolved Universal Terrestrial Radio Access (E-UTRA); Radio Resource Control (RRC); Protocol Specification (3GPP TS 36-331 version 10.2.0 Release 10)"; Jul. 1, 2011; 298 pages.
Huawei, HiSilicon; "Handling of Resource Restriction Patterns at Handover"; 3GPP TSG-RAN WG2 Meeting #73bis (R2-112004); Shanghai, China; Apr. 11-15, 2011; 2 pages.
ITRI; "Clarificcation on Measurement Resource Restriction when Handover"; 3GPP TSG-RAN WG2 #73 (R2-111236); Taipei, Taiwan; Feb. 21-25, 2011; 2 pages.
LG Electronics Inc.; "Measurement Restriction for Macro-Pico Scenario"; 3GPP TSG-RAN2 Meeting #72 (R2-106579); Jacksonville, Florida; Nov. 15-19, 2010; 3 pages.
ZTE; "Discussion on Measurement Restriction of eICIC"; 3GPP TSG-RAN WG2 Meeting #72 (R2-106332); Jacksonville, Florida; Nov. 15-19, 2010; 5 pages.
International Search Report and Written Opinion of the International Searching Authority issued in International Application No. PCT/US2011/047577 on Apr. 3, 2012; 20 pages.
3GPP TS 36.300 V10.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) Jun. 2011.

(Continued)

*Primary Examiner* — Robert Wilson
*Assistant Examiner* — Ronald H Davis
(74) *Attorney, Agent, or Firm* — Fish & Richardson P.C.

(57) ABSTRACT

In some implementations, a method includes identifying handover from a source eNodeB (eNB) to a target eNB or reestablishment with a subsequent eNB after losing connection with an initial eNB. Time-domain measurement resource restrictions for the UE are identified. The time-domain measurement resource restriction for the UE is released in connection with identifying the handover or the reestablishment.

24 Claims, 12 Drawing Sheets

(56) References Cited

OTHER PUBLICATIONS

3GPP TS 36.331 V8.14.0; 3rd Generation Partnership Project;Technical Specification Group Radio Access Network; Evolved Universal Terrestrial Radio Access (E-UTRA);Radio Resource Control (RRC); Protocol specification(Release 8); Jun. 2011.

International Preliminary Report on Patentability under Chapter I issued in International Application No. PCT/US2011/047577 on Feb. 27, 2014; 13 pages.

* cited by examiner

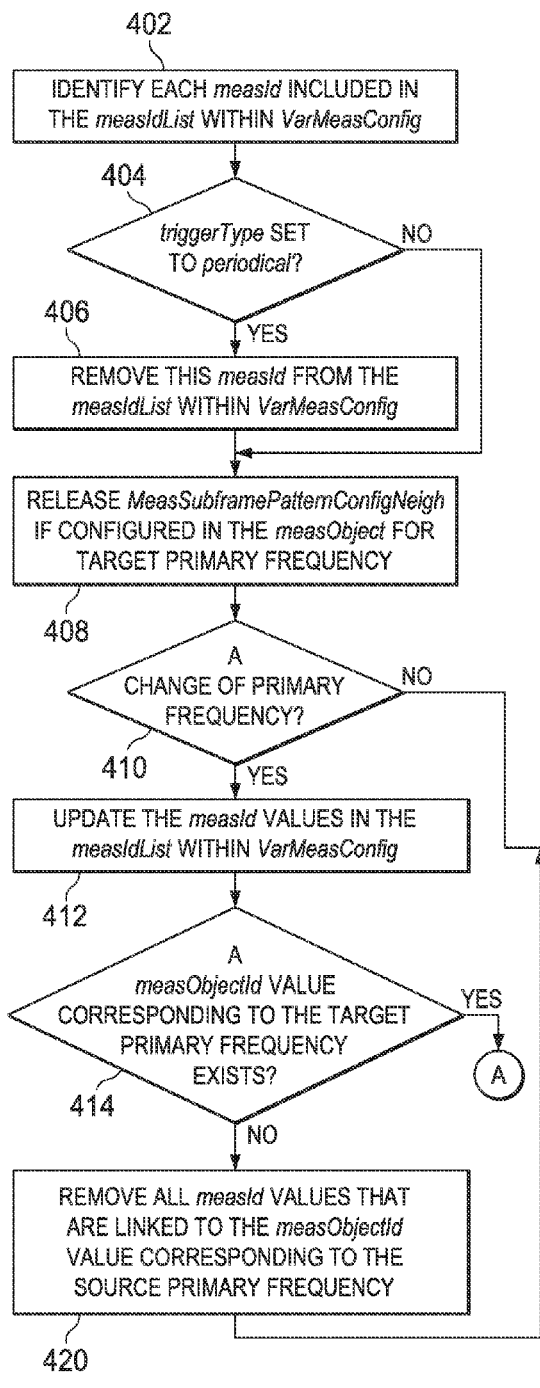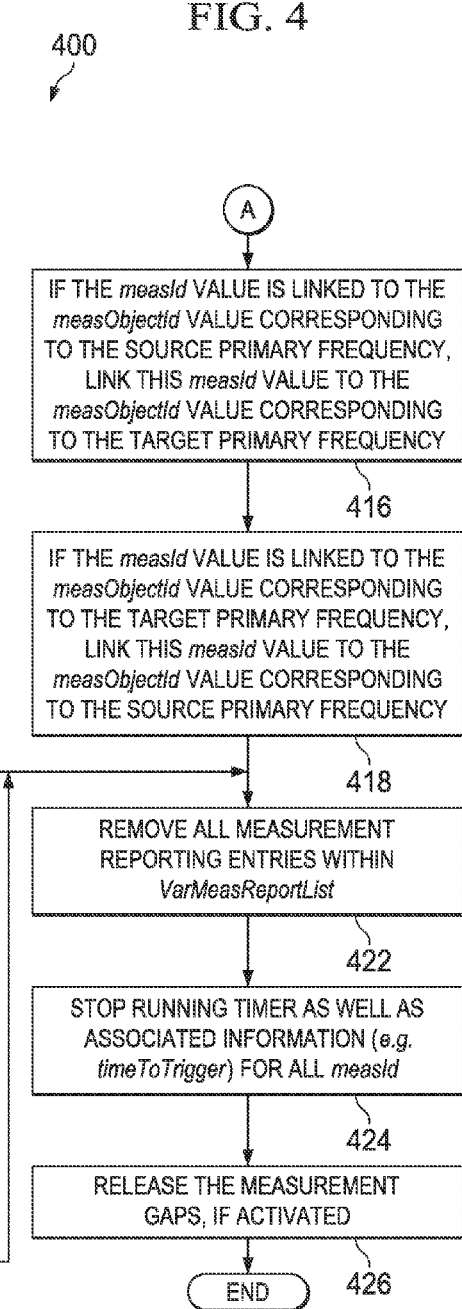
FIG. 4

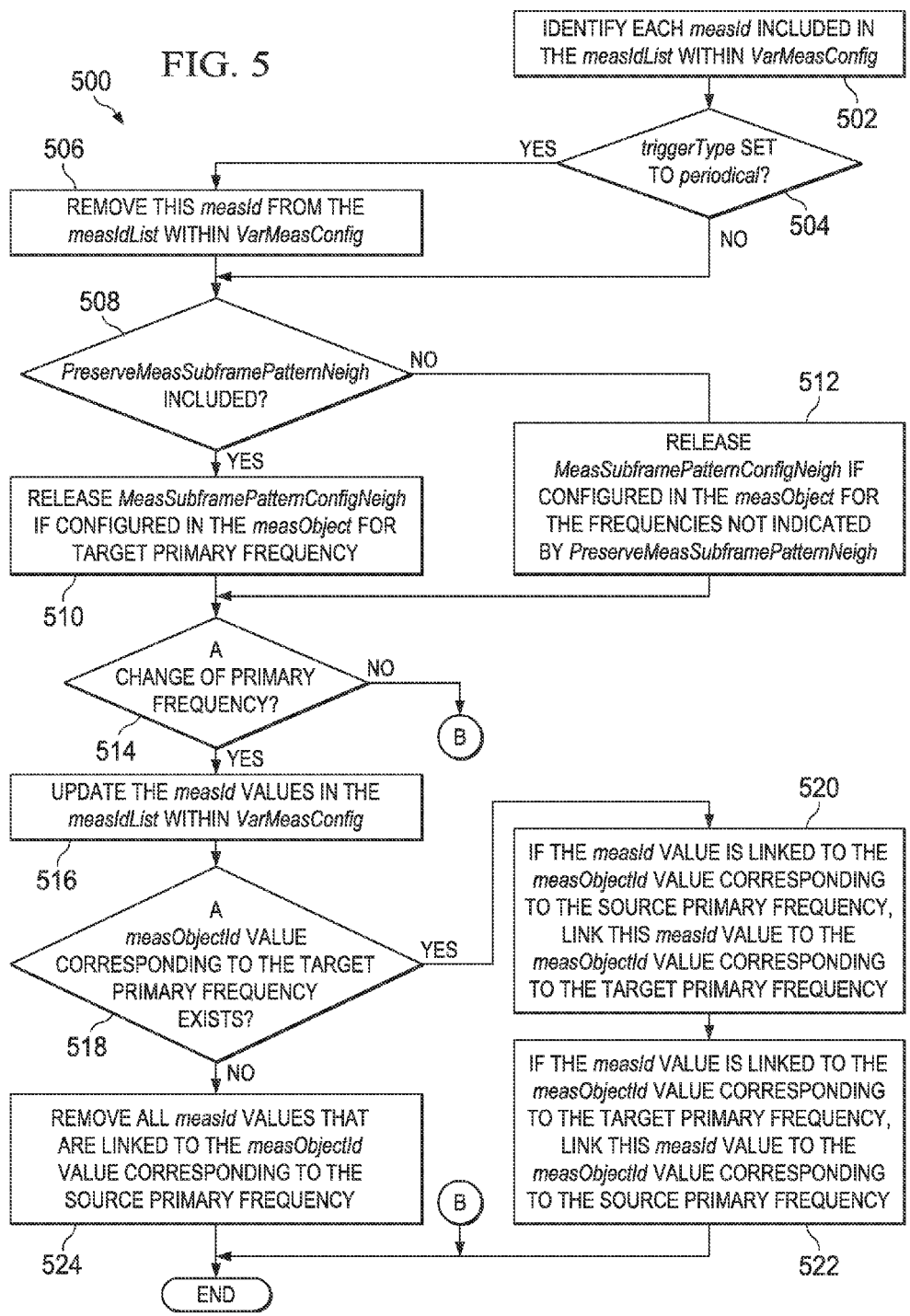

```
-- ASN1START

MobilityControlInfo ::=    SEQUENCE {
    targetPhysCellId           PhysCellId,
    carrierFreq                CarrierFreqEUTRA                              OPTIONAL,  -- Cond HO-toEUTRA
    carrierBandwidth           CarrierBandwidthEUTRA                         OPTIONAL,  -- Cond HO-toEUTRA
    additionalSpectrumEmission AdditionalSpectrumEmission                    OPTIONAL,  -- Cond HO-toEUTRA
    t304                       ENUMERATED {
                                   ms50, ms100, ms150, ms200, ms500, ms1000,
                                   ms2000, spare1},
    newUE-Identity             C-RNTI,
    radioResourceConfigCommon  RadioResourceConfigCommon,
    rach-ConfigDedicated       RACH-ConfigDedicated                          OPTIONAL,  -- Need OP
    ...,
    [[ preserveMeasSubframePatternNeigh  ENUMERATED {TARGET, SOURCE, ANY}    OPTIONAL   -- Need OP
    ]]
}
                                    602

CarrierBandwidthEUTRA ::=   SEQUENCE {
    dl-Bandwidth               ENUMERATED {
                                   n6, n15, n25, n50, n75, n100, spare10,
                                   spare9, spare8, spare7, spare6, spare5,
                                   spare4, spare3, spare2, spare1},
    ul-Bandwidth               ENUMERATED {
                                   n6, n15, n25, n50, n75, n100, spare10,
                                   spare9, spare8, spare7, spare6, spare5,
                                   spare4, spare3, spare2, spare1}           OPTIONAL   -- Need OP
}

CarrierFreqEUTRA ::=        SEQUENCE {
    dl-CarrierFreq             ARFCN-ValueEUTRA,
    ul-CarrierFreq             ARFCN-ValueEUTRA,                             OPTIONAL   -- Cond FDD
}

-- ASN1STOP
```

```
-- ASN1START

RRCConnectionReestablishment ::=    SEQUENCE {
    rrc-TransactionIdentifier           RRC-TransactionIdentifier,
    criticalExtensions                  CHOICE {
        c1                              CHOICE {
            rrcConnectionReestablishment-r8     RRCConnectionReestablishment-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionReestablishment-r8-IEs ::=  SEQUENCE {
    radioResourceConfigDedicated        RadioResourceConfigDedicated,
    nextHopChainingCount                NextHopChainingCount,
    nonCriticalExtension                RRCConnectionReestablishment-v8a0-IEs    OPTIONAL
}

RRCConnectionReestablishment-v8a0-IEs ::=  SEQUENCE {
    lateNonCriticalExtension            OCTET STRING                             OPTIONAL,
    nonCriticalExtension                RRCConnectionReestablishment-v1030-IEs   OPTIONAL
}

RRCConnectionReestablishment-v1030-IEs ::=  SEQUENCE {
    preserveMeasSubframePatternNeigh    ENUMERATED {TARGET, SOURCE, ANY}         OPTIONAL    -- Need OP,
    nonCriticalExtension                SEQUENCE {}                              OPTIONAL    -- Need OP
}
                                                    702

-- ASN1STOP
```

700

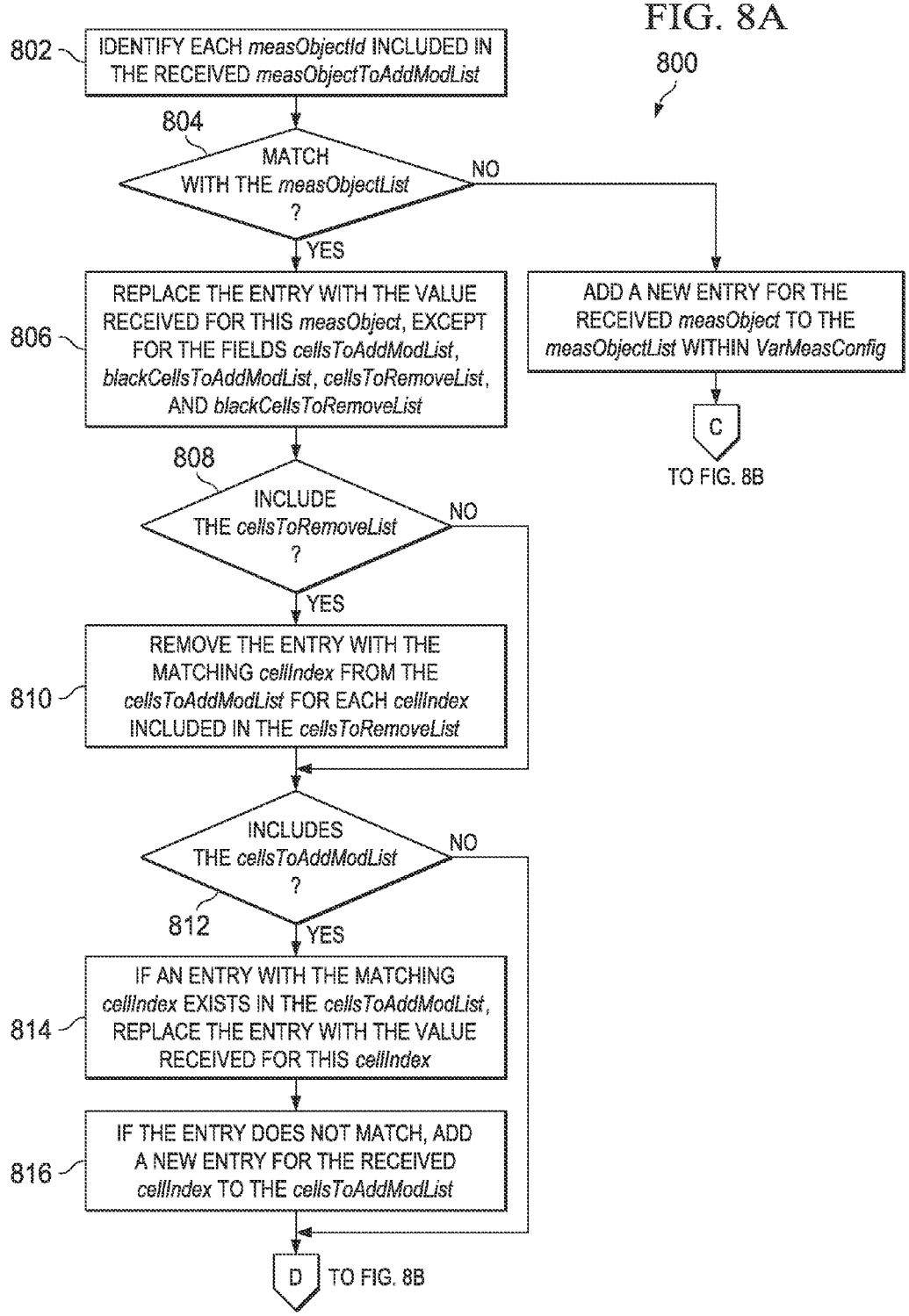

FIG. 9

```
-- ASN1START

MeasObjectEutra          ::=    SEQUENCE {
    carrierFreq                     ARFCN-ValueEUTRA,
    allowedMeasBandwidth            AllowedMeasBandwidth,
    presenceAntennaPort1            PresenceAntennaPort1,
    neighCellConfig                 NeighCellConfig,
    offsetFreq                      Q-offsetRange                DEFAULT dB0,
    -- Cell list
    cellsToRemoveList               CellIndexList                OPTIONAL,    -- Need ON
    cellsToAddModList               CellsToAddModList            OPTIONAL,    -- Need ON
    -- Black list
    blackCellsToRemoveList          CellIndexList                OPTIONAL,    -- Need ON
    blackCellsToAddModList          BlackCellsToAddModList       OPTIONAL,    -- Need ON
    cellForWhichToReportCGI         PhysCellId                   OPTIONAL,    -- Need ON
    ...,
    [[measCycleSCell-r10            MeasCycleSCell-r10           OPTIONAL,    -- Need ON
      measSubframePatternConfigNeigh-r10  MeasSubframePatternConfigNeigh-r10 OPTIONAL  -- Need OR ON
    ]]
                                                                                      ─────
                                                                                        902
}
```

```
-- ASN1START

HandoverPreparationInformation ::=    SEQUENCE {
    criticalExtensions                    CHOICE {
        c1                                    CHOICE {
            handoverPreparation-r8              HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE {}
    }
}

HandoverPreparationInformation-r8-IEs ::=   SEQUENCE {
    ue-RadioAccessCapabilityInfo            UE-CapabilityRAT-ContainerList,
    as-Config                               AS-Config             OPTIONAL,   -- Cond HO
    rrm-Config                              RRM-Config            OPTIONAL,   -- Cond HO
    as-Context                              AS-Context            OPTIONAL,
    nonCriticalExtension                    HandoverPreparationInformation-v920-IEs  OPTIONAL
}

HandoverPreparationInformation-v920-IEs ::= SEQUENCE {
    ue-ConfigRelease-r9                     ENUMERATED {
        rel9, rel10, spare6, spare5, spare4, spare3,
        spare2, spare1,...}                                       OPTIONAL,   -- Cond HO2
    nonCriticalExtension                    HandoverPreparationInformation-v1030-IEs  OPTIONAL
}
         ↖ 1002

HandoverPreparationInformation-v1030-IEs ::= SEQUENCE {
    fullConfig      ENUMERATED  {true}                            OPTIONAL,   -- Need OP,
    nonCriticalExtension                    SEQUENCE {}           OPTIONAL
}
         ↖ 1004

-- ASN1STOP
```

FIG. 10

RELEASING TIME DOMAIN MEASUREMENT RESTRICTIONS

TECHNICAL FIELD

This invention relates to communication networks and, more particularly, to releasing time-domain measurement restrictions.

BACKGROUND

A heterogeneous network (HetNet) is a network that includes macro cells and low-power nodes such as pico cells, femto cells, and relays. The low-power nodes or small cells are frequently overlaid on top of macro cells, possibly sharing the same frequency. These small cells may offload macro cells, improve indoor and cell edge performance, or provide other advantages. 3GPP studies for LTE-Advanced (Release 10) include HetNet deployments as a major performance enhancement enabler. In HetNet deployments, inter cell interference coordination (ICIC) plays an essential role, and time domain based resource sharing or coordination has been adopted as enhanced ICIC (eICIC), which includes Almost Blank Subframe (ABS) based solutions. LTE-Advanced (LTE-A) identifies two main deployment scenarios where eICIC is utilized. In a first or CSG (Femto cell) scenario, dominant interference condition may occur when non-member users are in close proximity of a CSG cell. In some instances, downlink transmission from the nonmember CSG cell may significantly interfere with the Physical Downlink Control Channel (PDCCH). Interference to the PDCCH of the macro cell may have a detrimental impact on both uplink and downlink data transfer between the UE and the macro cell. In addition, the downlink transmission from the non-member CSG cell may also interfere with other downlink control channels and reference signal, which may originate from both the macro cell and neighbor cells and may be used for cell measurements and radio link monitoring. Depending on network deployment and strategy, the system may not be able to divert the users suffering from inter-cell interference to another E-UTRA carrier or other Radio Access Technology (RAT). Time domain ICIC may be used to allow such non-member UEs to remain served by the macro cell on the same frequency layer. The interference may be eliminated, minimized, or otherwise reduced by the CSG cell utilizing Almost Blank Subframes (ABSs) to protect the corresponding macro cell's subframes from the interference. A non-member UE may be signaled to utilize the protected resources for radio resource measurements (RRM), radio link monitoring (RLM) and Channel State Information (CSI) measurements for the serving macro cell, allowing the UE to continue to be served by the macro cell under strong interference from the CSG cell.

In a second or Pico scenario, time domain ICIC may be utilized for pico cell users who are served on the edge of the serving pico cell such as for traffic off-loading from a macro cell to a pico cell. Typically, downlink transmissions from the macro cell may severely interfere with the PDCCH. In addition, the downlink transmission from the macro cell may also interfere with other downlink control channels and reference signals from both the pico cell and neighbor pico cells. The other downlink control channels and reference signals may be used for cell measurements and radio link monitoring. Time domain ICIC may be utilized to allow such UEs to remain served by the pico cell on the same frequency layer. This interference may be reduced by the macro cell(s) utilizing ABSs to protect the corresponding pico cell's subframes from the interference. A UE served by a pico cell may use the protected resources for radio resource measurements (RRM), radio link monitoring (RLM) and Channel state information (CSI) measurements for the serving pico cell.

For the time domain ICIC, subframe utilization across different cells are coordinated in time through backhaul signaling or operations and management (OAM) configuration of so called ABS patterns. In general, the ABSs in an aggressor cell are used to protect resources in subframes in the victim cell receiving strong inter-cell interference from the aggressor cell. ABSs are subframes with reduced transmit power (including no transmission) on some physical channels and/or reduced activity. The eNB ensures backwards compatibility towards UEs by transmitting necessary control channels and physical signals as well as system information. Patterns based on ABSs are signaled to the UE to restrict the UE measurement to specific subframes, called time domain measurement resource restrictions. Different patterns may be implemented depending on the type of measured cell (serving or neighbor cell) and measurement type (e.g. RRM, RLM). In some cases, the macro eNB (the aggressor) configures and transfers the ABS patterns to the pico eNB (victim). The macro eNB does not schedule data transmissions in ABS subframes to protect the UEs served by the pico eNB in the edge of the pico cell. The pico eNB may schedule transmission to and from the UEs in the cell center regardless of the ABS patterns. Meanwhile, the pico eNB may schedule transmission to and from the UEs in the edge of the cell only in ABSs. The pico cell may configure the UE which is in the edge of the cell with three different measurement resource restrictions independently based on the received ABS pattern. The first restriction may be for RRM measurement and radio link monitoring (RLM) for the PCell (in this case the serving pico cell on the primary frequency). If configured, the UE measures and performs RLM of the PCell only in the configured subframes. The second restriction is for RRM measurement of neighbor cells on the primary frequency. If configured, the UE measures neighbor cells in the configured subframes only. The restriction may also contain target neighbor cells to which the restriction will be applied. The third restriction is for channel state estimation of the PCell. If configured, the UE estimate CSI and CQI/PRM/RI in the configured subframes only.

According to the current Radio Resource Control (RRC) protocol specification, MeasSubframePatternConfigNeigh is an optional (need ON) information element (IE) within the EUTRA measurement object, measObjectEUTRA. The phrase "need ON" means that, in case the information element is absent, the UE takes no action and, where applicable, continues to use the existing value (and/or the associated functionality).

In some scenarios, intra frequency handover may switch the UE to an area managed by the Release 8 or 9 eNB or LTE system or LTE-A system without eICIC/HetNet features as opposed to an LTE-A system with support of eICIC/HetNet features. The target eNB prepares the handover command, but the target eNB does not support the time domain measurement resource restriction. The target Release 8 or 9 eNB is not capable of indicating release of the restriction in the prepared handover command or releasing the restriction by a reconfiguration message after the handover without utilizing the full configuration option, by which all radio configurations including measurement configurations are released. With the full configuration options, the size of the reconfiguration messages is larger than without the option. Therefore, the use of this option should be limited to maintain efficient operations. Also, the target LTE-A eNB without eICIC/HetNet features may not instruct the UE to release the measurement restrictions. Then the UE would continue to apply the restriction because the measSubframePatternConfigNeigh is not included in the handover command. In the intra frequency handover example, the measurement resource restriction for neighbor cells may be applied incoherently, i.e., the UE applies the restriction but the eNB does not. The incoherent application may result in unintended handover or radio link failure due to the difference in performance requirements (RSRP and RSRQ accuracy and detection time of neighbor cells) with or without the measurement resource restrictions for neighbor cells. With the measurement resource restriction, better signal to interference and noise ratio (SINR) is required to have the same RSRP (Reference Signal Received Power) and RSRQ (Reference Signal Received Quality) accuracy than without the restriction, so the measurement results reported by the UE applying the restriction may be less accurate than the eNB expects, which may result in an unintended handover. In addition, it may take longer time to detect a neighbor intra frequency cell with the measurement restriction, which may results in radio link failure. The source eNB may perform measurement reconfiguration while preparing the handover with the target eNB. However, due to this additional processing, the handover execution may be delayed, which results in higher handover failure rate.

With regard to inter-frequency handover cases, after inter-frequency handover (f1 to f2), time domain measurement resource restriction configured for the source primary frequency (f1) is not applied to f1 (since f1 is not the primary frequency anymore after the handover) but maintained (not released) unless explicitly done so by RRC Connection Reconfiguration message. Depending on the release of target eNB or support of eICIC/HetNet features, the time domain measurement resource restriction for neighbor cells may be applied incoherently, i.e., the UE applies the restriction but the eNB does not. The incoherent application may result in unintended handover or radio link failure as explained above.

In some scenarios, after the handover (f1 to f2) mentioned above, the subsequent inter-frequency handover (f2 to f1) brings the UE to the area managed by the Release 8 or 9 eNB or the LTE-A eNB without eICIC/HetNet features. The target eNB prepares the handover command. In this case, the target eNB does not support the time domain measurement resource restriction. The target Release 8 or 9 eNB is not capable of indicating release of the restriction in the prepared handover command or releasing the restriction by a reconfiguration message after the handover without utilizing the full configuration option, by which all radio configurations including measurement configurations are released. With the full configuration options, the size of the reconfiguration messages is larger than without the option. Therefore, the use of option should be limited to maintain efficient operations. Also, the target LTE-A eNB without eICIC/HetNet features may not instruct the UE to release the measurement restrictions. Then, the UE restarts to apply the restriction for f1 upon the handover. The issue above is also applicable to the case when the UE reestablishes the RRC connection. The time domain measurement resource restriction for neighbor cells may be applied incoherently, which may result in another radio link failure or unintended handover.

In some scenarios, after experiencing radio link failure, the UE may find a suitable cell and reestablishes the RRC connection in the cell controlled by release 8/9 eNB or LTE-A eNB without eICIC/HetNet features. In this case, the subsequent eNB does not support the time domain measurement resource restriction. The subsequent Release 8 or 9 eNB is not capable of indicating release of the restriction in the by a reconfiguration message after the reestablishment without utilizing the full configuration option, by which all radio configurations including measurement configurations are released. With the full configuration options, the size of the reconfiguration messages is larger than without the option. Therefore, the use of option should be limited to maintain efficient operations. Also, the subsequent LTE-A eNB without eICIC/HetNet features may not instruct the UE to release the measurement restrictions. Then, the UE will start to apply the restriction upon the reestablishment. This issue applies irrespective of the frequency of the cell on which the UE reestablishes the RRC connection.

In some scenarios, the UE reestablishes the RRC connection in the cell where the restriction is no longer applied. The eNB releases the restriction by sending a reconfiguration message after the reestablishment procedure but the message transmission delays due to heavy load on the eNB or the message does not reach to the UE due to bad radio condition. Meanwhile, the UE restarts to apply the restriction. This issue applies irrespective of the frequency of the cell on which the UE reestablishes the RRC connection.

DESCRIPTION OF DRAWINGS

FIGS. 4 and 5 illustrate example methods for releasing time-domain measurement restrictions;

FIG. 6 illustrates an example MobilityControlInfo information element that includes preserveMeasSubframePattern-Neigh;

FIG. 7 illustrates an example RRCConnectionReestablishment message that includes preserveMeasSubframePattern-Neigh;

FIG. 9 illustrates an example MeasObjectEUTRA information element;

FIG. 10 illustrates an example HandoverPreparationInformation message;

Like reference symbols in the various drawings indicate like elements.

DETAILED DESCRIPTION

Figure 1:
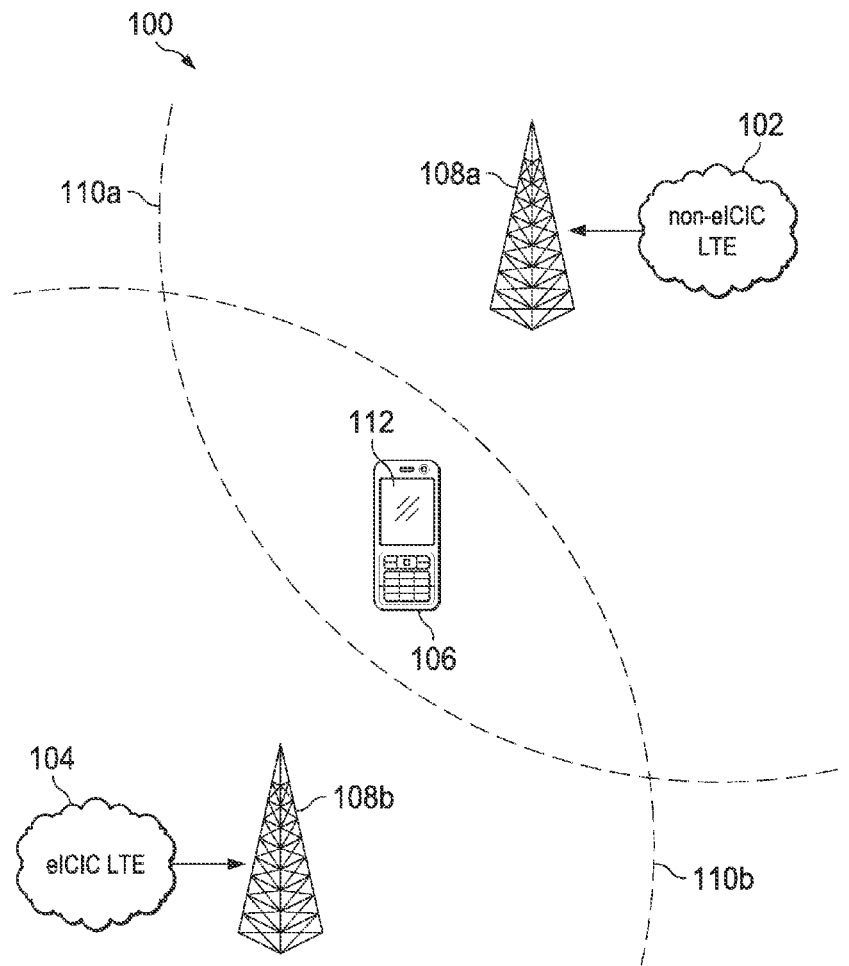
FIG. 1 is an example system for releasing time-domain measurement restrictions in accordance with some implementations of the present disclosure.

The disclosure is directed to a system and method for releasing time domain measurement resource restrictions in accordance with some implementations of the present disclosure. For example, the UE may release the time domain measurement resource restriction for neighbor cells upon handover or reestablishment. The UE may release the time domain measurement resource restriction for neighbor cells configured for the source primary frequency, target primary frequency, or any EUTRA frequency. In general, LTE systems or LTE-A systems without eICIC/HetNet features, as opposed to LTE Advanced (LTE-A) systems with eICIC/HetNet features, include eNBs or legacy eNBs that do not support time-domain measurement resource restrictions. In order to eliminate the problems caused by the eNBs without eICIC/HetNet features, the measurement resource restrictions for neighbor cells configured for the target primary frequency may be automatically released to avoid the problems associated with a UE executing the restrictions while the eNB is not. For example, the UE may identify a handover or a reestablishment and automatically release any time-domain measurement resource restrictions for the target primary frequency, for source primary frequency or for any EUTRA frequency. By automatically releasing the restrictions configured for the target primary frequency in response to at least a handover or reestablishment, impact of the preconfigured restrictions can be minimized or otherwise reduced, and problems may be sufficiently avoided. This implementation is a simple solution and may be executed with independent of or with no change to RRC signaling. In addition, the solution may be executed in accordance with Release 10 standards. After releasing the restrictions, the target eNB may reestablish the restriction if the same restriction is needed in the target cell.

When the source eNB requests handover preparation from the target eNB, the source eNB indicates ue-ConfigRelease which indicates the RRC protocol release applicable for the current UE configuration. For example, when the UE is configured with time domain measurement restriction, ue-ConfigRelease is set to Release 10. This information could be used by target eNB to decide if the full configuration approach should be used. If this field is not present, the target assumes that the current UE configuration is based on the Release 8 version of RRC protocol. Full configuration options include an initialization of the radio configuration, which makes the procedure independent of the configuration used in the source cell(s) with the exception that the security algorithms are continued for the RRC re-establishment. The reconfiguration message size increases with the full configuration option, therefore its use should be limited to maintain efficient operation. With the proposed automatic release of the measurement restriction by the UE, the source eNB may set the ue-ConfigRelease to Release 8 or 9 in order to avoid the full configuration by the target Release 8 or 9 eNB even when the UE is configured with the time domain measurement restrictions. In the area of the network where the time domain measurement restriction is utilized, the serving eNB may avoid use of more advanced multi antenna transmission techniques defined in Release 10. Therefore, with automatic release of the time domain measurement restrictions by the UE, the change of avoiding full configuration upon handover or reestablishment from LTE-A system with eICIC/HetNet features to LTE system would increase. Alternatively, the handover preparation request may be extended to indicate that no full reconfiguration is required as shown in the FIG. 10, which illustrates an example HandoverPreparationInformation message 1000.

In some implementations, time-domain measurement resource restrictions may be released for neighbor cell by defining measSubframePatternConfigNeigh as "need OR" in the MeasObjectEUTRA information element. The phrase "need OR" means that, if the message is received by the UE and in case the information element is absent, the UE may discontinue, stop using, delete, or other release any existing values. In other words, the UE may maintain the time-domain measurement resource restriction if an information element instructs the UE to maintain the restrictions. Absence of the information element may instruct the UE to release the time-domain measurement resource restrictions. To implement this solution, the RRC signaling definition in Release 10 may be updated.

In some implementations, the target eNB may indicate in a handover command if the time domain measurement resource restriction for a neighbor cell should be preserved. The preservation indication may be for the measurement object of the target primary frequency only, source primary frequency only, or any EUTRA frequency. For example, the preservation may be indicated for the target frequency if the same restriction can be applicable in the target cell, which may eliminate configuring the restriction again. The indication may be transmitted in the RRC Connection Reconfiguration message to the UE. If the UE receives the preservation indication in the reconfiguration message, the UE may maintain the measurement resource restrictions for the frequency specified by the preservation indication and release the measurement resource restrictions for the other EUTRA frequencies. If the preservation indication is not present, the UE may release the time-domain measurement resource restriction for neighbor cells configured for the target primary frequency, source primary frequency, or any EUTRA frequency. In the case where the target eNB is Release 8 or 9, the preservation indication is not present, then the UE my release the measurement restriction configured for the target primary frequency, the source primary frequency or any ETURA frequency. In reestablishment procedures, the eNB handling the reestablishment indicates whether the restriction for the target primary frequency, the source primary frequency or any ETURA frequency should be preserved. If the previously configured restriction is applicable in the cell where the reestablishment takes place, the indication may be transmitted in the RRC Connection Reestablishment message.

In some implementation, the target LTE-A eNB without eICIC/HetNet features instruct the UE to release the time domain measurement restrictions if the UE is configured with the restriction by setting measSubframePatternConfigNeigh to release in the prepared handover command.

As described, some implementations may include an additional information element to indicate whether to preserve the restrictions. Another solution may be that the source eNB may add the measurement configuration information element to the handover command prepared by the target eNB. For example, if explicit release of measurement resource restriction is required, the source eNB may include the indication in the handover command prepared by the target eNB. The source eNB may acquire the knowledge of target eNB release information via OAM system. Alternatively or in addition, the X2 interface may be extended to carry the eNB release information.

Turning to a description of environments, FIG. 1 illustrates an example system 100 for releasing time-domain measurement resource restrictions in connection with a handover or reestablishment. For example, the system 100 may release time-domain measurement resource restrictions for specified frequency, pre-determined frequency or pre-configured frequency in response to least a handover or reestablishment. As illustrated, the system 100 includes an LTE system or LTE-A system without eICIC/HetNet features (non-eICIC LTE system) 102 and an LTE system with eICIC/HetNet features (eICIC LTE system) 104 configured to communicate with UE 106. The non eICIC system 102 includes a base station 108a for wirelessly communicating with the UE 106, which may have a signal coverage area which is partially designated by a dashed line 110a. As previously mentioned, the non eICIC system 102 is not configured to execute time-domain measurement resource restrictions as compared with LTE-A systems with eICIC/HetNet features such as eICIC system 104. The system 104 includes a base station 108b for wirelessly communicating with the UE 106, which may have a signal coverage area which is partially designated by a dashed line 110b. The eICIC system 104 is configured to execute time-domain measurement resource restrictions using ABSs. In some implementations, the UE 106 may execute one or more of the following: identify a handover to or a reestablishment; release time-domain measurement resource restrictions in connection with the handover or the reestablishment; automatically release the time-domain measurement resource restrictions in response to the handover or the reestablishment; receive a message from the eICIC system 104 including information indicating to the UE 106 whether to release or maintain the time-domain measurement resource restrictions; releasing restrictions for at least one of a target primary frequency, a source primary frequency, an initial primary frequency, a subsequent primary frequency, or any EUTRAN frequency. By releasing the time-domain restrictions, incoherent application of the restrictions may eliminated or otherwise reduced, which may improve the mobility robustness by avoiding unintended handover and radio link failure.

Turning to a more detailed description of the elements, the non eICIC system 102 wirelessly communicates using the base station 108a or eNB 108. In some implementations, the non eICIC system 102 can include a plurality of eNBs. In some implementations, the non-eICIC system 102 is in communication with a network that provides connectivity with other wireless communication systems and wired communication systems. The non eICIC system 102 may communicate with UE 106 using a wireless technology orthogonal frequency division multiplexing (OFDM). Similarly, the eICIC system 104 includes the eNB 108b and communicates using OFDM. In addition, the eICIC system 104 may execute Almost Blank Subframes (ABSs) to reduce inter cell interference by coordinating in time through backhaul signaling or operations and management (OAM) configuration. The eICIC system 104 may use the ABSs in an aggressor cell to protect resources in subframes in the victim cell receiving strong inter-cell interference from the aggressor cell. As previously mentioned, the ABSs are subframes with reduced transmit power (including no transmission) on some physical channels and/or reduced activity. The eNB 108b may signal patterns based on ABSs to the UE 106 to restrict the UE measurement to specific subframes, called time-domain measurement resource restrictions. Different patterns may be implemented depending on the type of measured cell (serving or neighbor cell) and measurement type (e.g. RRM, RLM).

In general, the UE 106 may receive and transmit wireless and/or contactless communication with the system 100. As used in this disclosure, the UE 106 are intended to encompass cellular phones, data phones, pagers, portable computers, SIP phones, smart phones, personal data assistants (PDAs), digital cameras, MP3 players, camcorders, one or more processors within these or other devices, or any other suitable processing devices capable of communicating information with the LTE system 102 and LTE-A system 104. In some implementations, the UE 106 may be based on a cellular radio technology. For example, the UE 106 may be a PDA operable to wirelessly connect with an external or unsecured network. In another example, the UE 106 may comprise a smartphone that includes an input device, such as a keypad, touch screen, mouse, or other device that can accept information, and an output device that conveys information associated with the LTE system 102 and the LTE-A system 104, including digital data, visual information, or Graphical User Interface (GUI) 112.

The GUI 112 comprises a graphical user interface operable to allow the user of the UE 106 to interface with at least a portion of the system 100 for any suitable purpose, such as authorizing presenting enablement of warning notifications. Generally, the GUI 112 provides the particular user with an efficient and user-friendly presentation of data provided by or communicated within the system 100 and/or also an efficient and user-friendly means for the user to self-manage settings and access services offered by the PLMN 102. The GUI 112 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 112 can include any graphical user interface, such as a generic web browser or touch screen that processes information in the system 100 and presents the results to the user.

Figure 2:
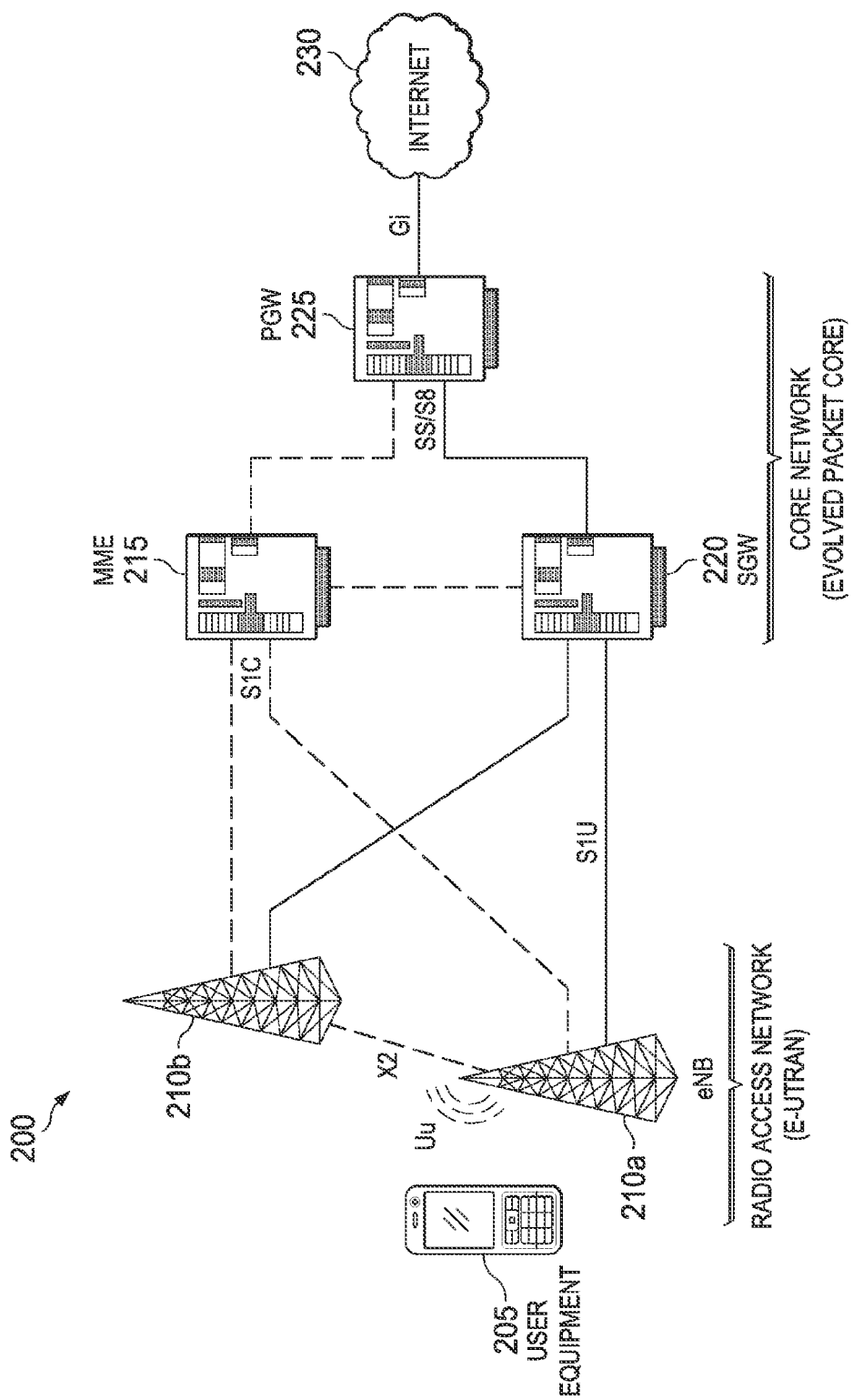
FIG. 2 is an example LTE system of FIG. 1.

Referring to FIG. 2, the LTE network 200 includes a core network called an Evolved Packet Core (EPC) and a LTE Radio Access Network, e.g., evolved UTRAN (E-UTRAN). The core network provides connectivity to an external network such as the Internet 230. The LTE network 200 includes one or more base stations such as eNodeB (eNB) base stations 210a and 210b that provide wireless service(s) to one or more devices such as UEs 205.

An EPC-based core network can include a Serving Gateway (SGW) 220, a Mobility Management Entity (MME) 215, and a Packet Gateway (PGW) 225. The SGW 220 can route traffic within a core network. The MME 215 is responsible for core-network mobility control attachment of the UE 205 to the core network and for maintaining contact with idle mode UEs. The PGW 225 is responsible for enabling the ingress/egress of traffic from/to the Internet 230. The PGW 225 can allocate IP addresses to the UEs 205.

A LTE-based wireless communication system has network interfaces defined between system elements. The network interfaces include the Uu interface defined between a UE and an eNB, the S1U user-plane interface defined between an eNB and a SGW, the S1C control-plane interface defined between an eNB and a MME (also known as S1-MME), and the S5/S8 interface defined between a SGW and a PGW. Note that the combination of S1U and S1C is often simplified to "S1."

Figure 3:
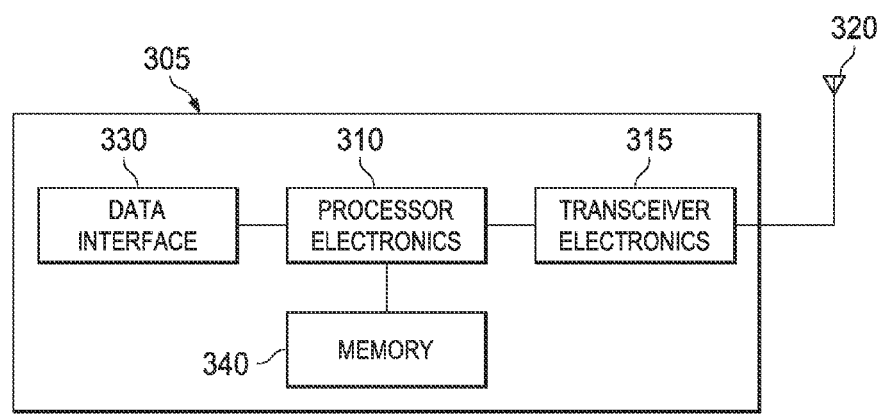
FIG. 3 illustrates an example UE of FIG. 1.

FIG. 3 shows an example UE 305 that includes processor electronics 310 such as a processor that implements one or more of the techniques presented in this document. A UE 305 can include transceiver electronics 315 to send and receive wireless signals over one or more communication interfaces such as one or more antennas 320. A UE 305 can include other communication interfaces for transmitting and receiving data. In some implementations, a UE 305 can include one or more wired network interfaces to communicate with a wired network. In other implementations, a UE 305 can include one or more data interfaces 330 for input/output (I/O) of user data (e.g., text input from a keyboard, graphical output to a display, touchscreen input, vibrator, accelerometer, test port, or debug port). A UE 305 can include one or more memories 340 configured to store information such as data and/or instructions. In still other implementations, processor electronics 310 can include at least a portion of transceiver electronics 315.

Figure 8B:
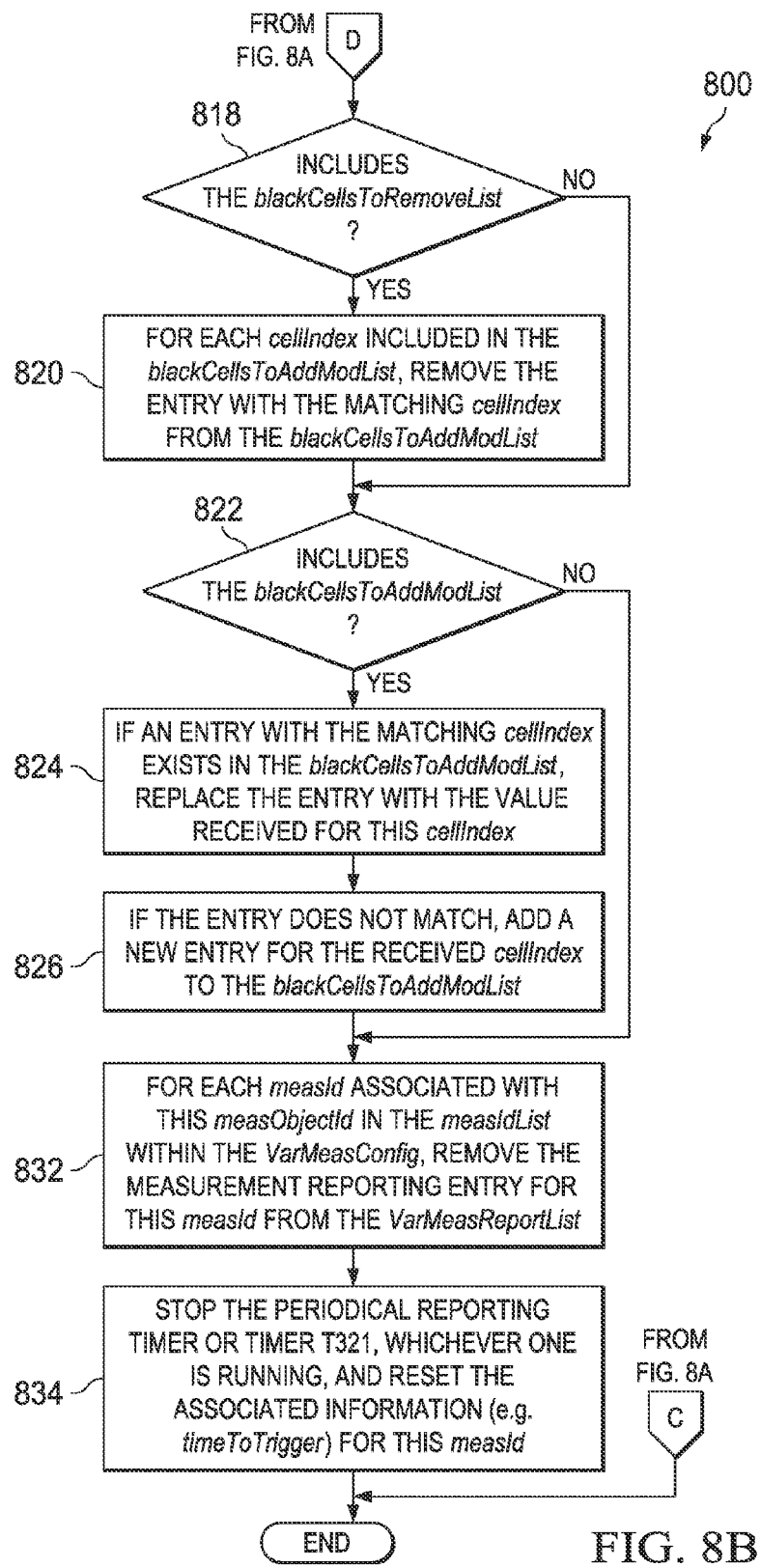
FIG. 8 illustrates another example method for releasing time-domain measurement restrictions.

FIGS. 4, 5, and 8 are flow charts illustrating example methods 400, 500, and 800 for releasing time-domain measurement resource restrictions. The illustrated methods 400, 500, and 800 are described with respect to system 100 of FIG. 1, but this method could be used by any other suitable system. Moreover, system 100 may use any other suitable techniques for performing these tasks. Thus, many of the steps in this flowchart may take place simultaneously and/or in a different order than the order shown. System 100 may also use methods with additional steps, fewer steps, and/or different steps, so long as the methods remain appropriate. In addition, the system 100 may have settings based on other granularities without departing from the scope of the disclosure.

Referring to FIG. 4, method 400 is a flowchart for automatically releasing time-domain measurement resource restrictions in response to a handover or a reestablishment. When regards to an E-UTRAN executing a handover, a measObjectId corresponding to each handover target primary frequency is configured. With regards to an E-UTRAN executing a reestablishment, a measObjectId corresponding to each handover target primary frequency is configured and the subsequent connection reconfiguration procedure immediately follows the reestablishment.

Method 400 begins at step 402 where the UE 106 identifies each measId included in the measIdList within VarMeasConfig. If the triggerType is set to periodical at decisional step 404, then the UE 106 removes this measId from the measIdList within VarMeasConfig at step 406. Otherwise, execution proceeds to step 408 where the UE releases MeasSubframePatternConfigNeigh if configured in the measObject for the target primary frequency. If the procedure was triggered due to a handover or successful reestablishment and process involves a change of primary frequency at decisional step 410, then, at step 412, the UE 106 updates the measId values in the measIdList within VarMeasConfig. If a measObjectId value corresponding to the target primary frequency exists at decisional step 414, then, at step 416, the measId value is linked to the measObjectId value corresponding to the target primary frequency if the measId value is linked to the measObjectId value corresponding to the source primary frequency. If the measId value is linked to the measObjectId value corresponding to the target primary frequency, this measId value is linked to the measObjectId value corresponding to the source primary frequency at step 418. Returning to decisional step 414, if a measObjectId value corresponding to the target primary frequency does not exist, then, at step 420, all measId values that are linked to the measObjectId value corresponding to the source primary are removed. At step 422, the UE 106 removes all measurement reporting entries within VarMeasReportList. Next, at step 424, the UE 106 stops the periodical reporting timer or timer T321, whichever one is running, as well as associated information (e.g., timeToTrigger) for all measId. The UE 106 releases the measurement gaps, if activated, at step 426. If the UE requires measurement gaps to perform inter-frequency or inter-RAT measurements, the UE may resume the inter-frequency and inter-RAT measurements after the E-UTRAN has setup the measurement gaps.

Figure 11:
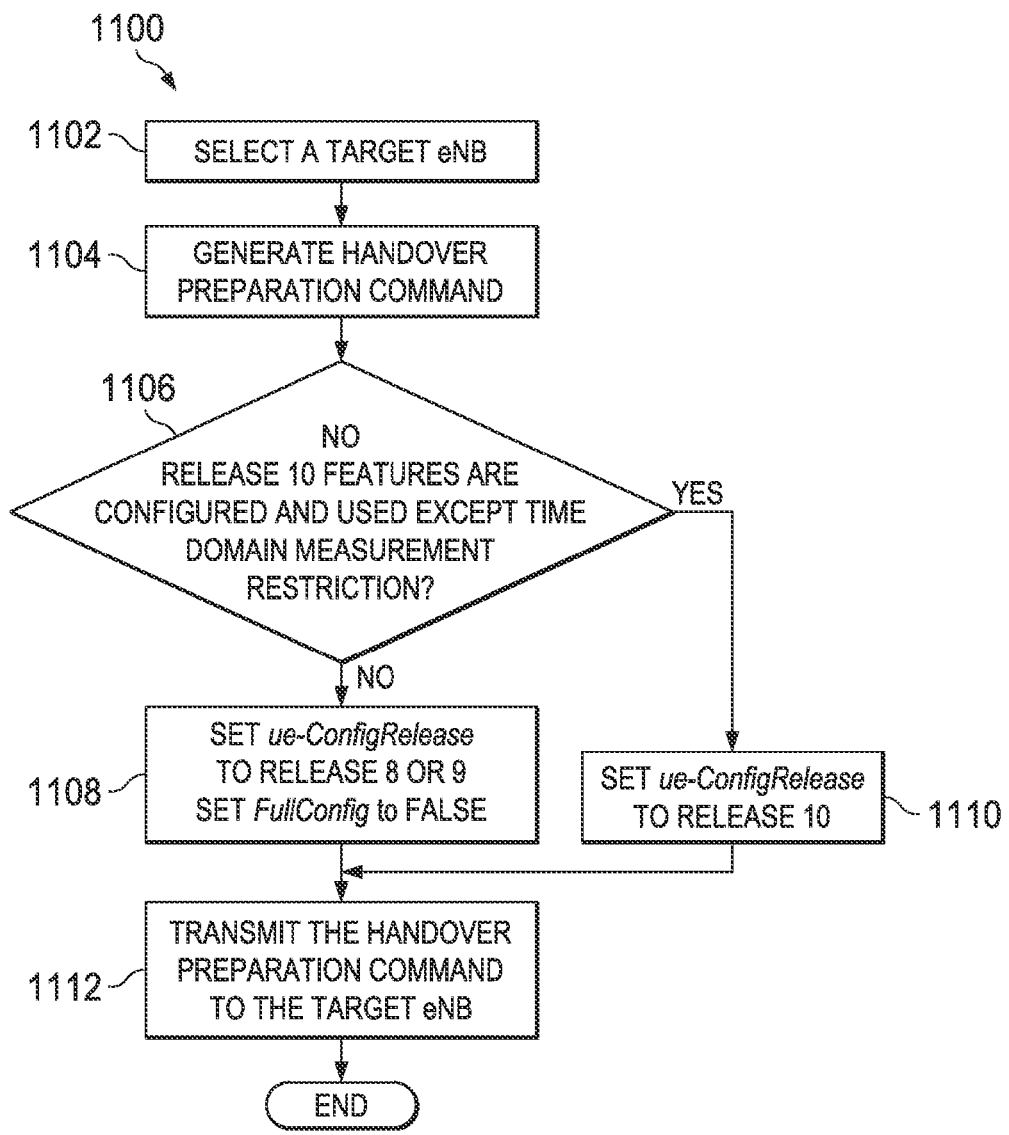
FIG. 11 is a flowchart illustrating yet another example method for releasing time-domain measurement restrictions.

Referring to FIG. 11, method 1100 is a flowchart for handover preparation by the eICIC LTE eNB 104 as a source eNB. The method 1100 begins at step 1102 where the source eNB 104 selects a target eNB to which the UE 106 is switched. At step 1104 the source eNB 104 generates a Handover Preparation Command which is illustrated in the FIG. 10. If the UE is configured with no Release 10 features except the time domain measurement restrictions at step 1106, the source eNB sets ue-ConfigRelease (1002 in the FIG. 10) to Release 8 or 9 depending on the release of features configured in the UE 106 in order to prevent the target eNB from applying the full configuration option. If only Release 8 features are configured except the time domain measurement restrictions, ue-ConfigRelease may not be included. The source eNB 104 may also set the FullConfig (1004 in the FIG. 10) to FALSE in order to prevent the target eNB from applying the full configuration option. If the UE is configured with Release 10 features except the time domain measurement restrictions at step 1106, the source eNB sets ue-ConfigRelease to Release 10 at step 1110. At step 1112 the source eNB 104 transmits Handover Preparation Command to the target eNB. The method above can be applied to other release 10 feature than the time domain measurement restriction.

Referring to FIG. 5, method 500 is a flowchart for releasing time-domain measurement resource restrictions when a preservation indication is omitted from communications in connection with a handover or a reestablishment. For example, the measurement resource restriction for neighbor cells may be released by the UE 106 upon handover or reestablishment if its preservation is not indicated as shown below. With regards to an E-UTRAN executing a handover, a measObjectId corresponding to each handover target primary frequency is configured. When regards to an E-UTRAN executing a reestablishment, a measObjectId corresponding to each handover target primary frequency is configured and the subsequent connection reconfiguration procedure immediately follows the reestablishment.

Method 500 begins at step 502 where the UE 106 identifies each measId included in the measIdList within VarMeasConfig. If the triggerType is set to periodical at decisional step 504, then the UE 106 removes this measId from the measIdList within VarMeasConfig at step 506. Otherwise, execution proceeds to decisional step 508. If a PreserveMeasSubframePatternNeigh is not included, then, at step 510, the UE 106 releases MeasSubframePatternConfigNeigh if configured in the measObject for the target primary frequency, for the source primary frequency or for any EUTRA frequency. If the PreserveMeasSubframePatternNeigh is included, the UE 106 releases, at step 512, MeasSubframePatternConfigNeigh if configured in the measObject for the frequencies not indicated by PreserveMeasSubframePatternNeigh. In regards to handovers, FIG. 6 illustrates an example MobilityControlInfo information element 600 that includes preserveMeasSubframePatternNeigh. This field is used to indicate for which frequency the measSubframePatternConfigNeigh is to be maintained upon handover. SOURCE means to preserve the restriction on the source primary frequency, and TARGET means to preserve the restriction on the target primary frequency and ANY means to preserve the restriction on any EUTRA frequency. In regards to reestablishment, FIG. 7 illustrates an example RRCConnectionReestablishment message 700 that includes preserveMeasSubframePatternNeigh. This field is used to indicate for which frequency the measSubframePatternConfigNeigh is to be maintained upon reestablishment. SOURCE means to preserve the restriction on the source primary frequency, and TARGET means to preserve the restriction on the target primary frequency and ANY means to preserve the restriction on any EUTRA frequency. If the procedure was triggered due to a handover or successful reestablishment and process involves a change of primary frequency at decisional step 514, then, at step 516, the UE 106 updates the measId values in the measIdList within VarMeasConfig. If a measObjectId value corresponding to the target primary frequency exists at decisional step 518, then, at step 520, the measId value is linked to the measObjectId value corresponding to the target primary frequency if the measId value is linked to the measObjectId value corresponding to the source primary frequency. If the measId value is linked to the measObjectId value corresponding to the target primary frequency, this measId value is linked to the measObjectId value corresponding to the source primary frequency at step 522. Returning to decisional step 528, if a measObjectId value corresponding to the target primary frequency does not exist, then, at step 524, all measId values that are linked to the measObjectId value corresponding to the source primary are removed.

Referring to FIG. 8, method 800 is directed to redefining a current information element or measSubframePatternConfig-Neigh such that the time-domain measurement resources restrictions are released in no explicit signaling is received in connection with a handover or reestablishment. Currently, measSubframePatternConfigNeigh is defined as OPTIONAL—Need ON, so explicit release is required to stop its application. The method 800 changes the value from Need ON to Need OR so that configured measSubframePatternConfigNeigh is released if no explicit signaling upon handover or reestablishment is received. An example an example MeasObjectEUTRA information element measSubframePatternConfigNeigh including a value of Need OR is illustrated in FIG. 9.

Method 800 begins at step 802 where the UE 106 identifies each measObjectId included in the received measObjectToAddModList. If an entry with the matching measObjectId exists in the measObjectList within the VarMeasConfig at decisional step 804, the UE 106 replaces, at step 806, the entry with the value received for this meas Object, except for the fields cellsToAddModList, blackCellsToAddModList, cellsToRemoveList, blackCellsToRemoveList and measSubframePatternConfigNeigh. If measSubframePatternConfigNeigh is configured in the measObject with the matching measObjectId and the received measObject does not include measSubframePatternConfigNeigh, the configured measurement restriction will be released. If the received measObject includes the cellsToRemoveList at decisional step 808, then, at step 810, for each cellIndex included in the cellsToRemoveList, the UE 106 removes the entry with the matching cellIndex from the cellsToAddModList. Otherwise, execution proceeds to decisional step 812. If the received measObject includes the cellsToAddModList, for each cellIndex value included in the cellsToAddModList, the UE 106 replaces, at step 814, the entry with the value received for this cellIndex if an entry with the matching cellIndex exists in the cellsToAddModList. If not, the UE 106 adds a new entry for the received cellIndex to the cellsToAddModList at step 816. If the received measObject includes the blackCellsToRemoveList at decisional step 818, then, for each cellIndex included in the blackCellsToRemoveList, the UE 106 removes the entry with the matching cellIndex from the blackCellsToAddModList at step 820. If not, execution proceeds to decisional step 822. If the received measObject includes the blackCellsToAddModList, for each cellIndex included in the blackCellsToAddModList, the UE 106 replaces, at step 824, the entry with the value received for this cellIndex if an entry with the matching cellIndex is included in the blackCellsToAddModList. If the not match, the UE 106 adds a new entry for the received cellIndex to the blackCellsToAddModList at step 826. At step 832, for each measId associated with this measObjectId in the measIdList within the VarMeasConfig, if any, the UE 106 removes the measurement reporting entry for this measId from the VarMeasReportList, if included. Next, at step 834, the UE 106 stops the periodical reporting timer or timer T321, whichever one is running, and reset the associated information (e.g., timeToTrigger) for this measId. Returning to decisional step 804, if a matching measObjectId does not exists in the measObjectList within the VarMeasConfig, then, at step 836, the UE 106 adds a new entry for the received measObject to the measObjectList within VarMeasConfig.

Figure 12:
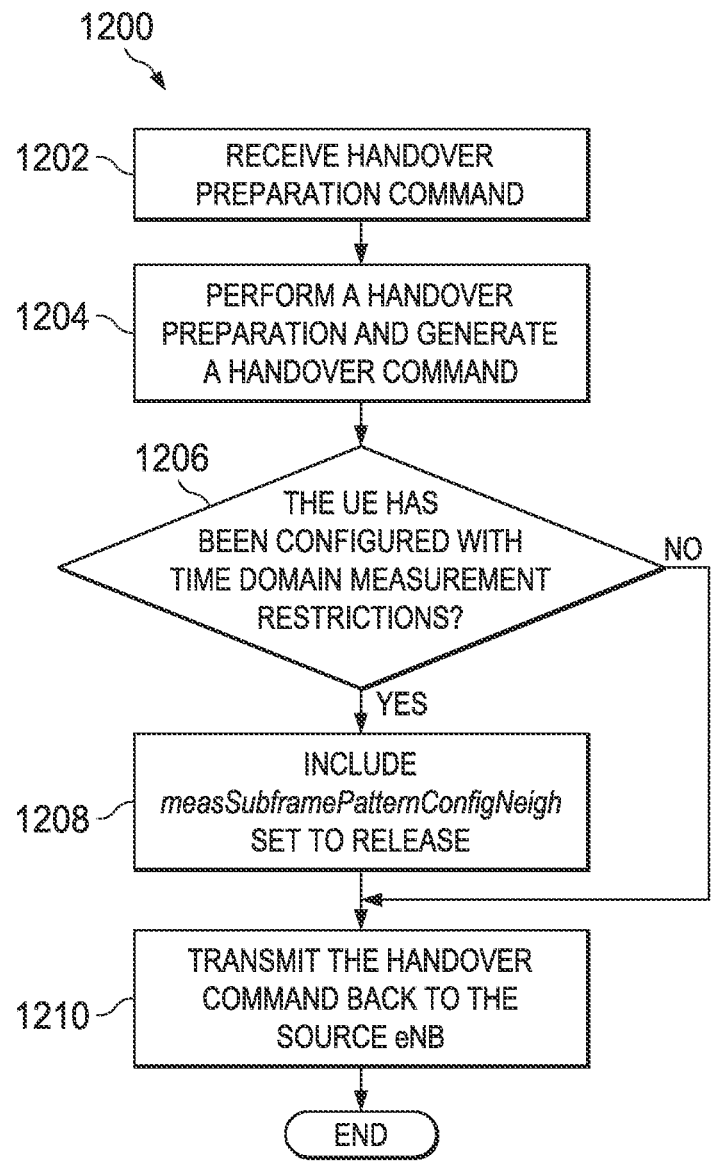
FIG. 12 is a flowchart illustrating another example method for releasing time-domain measurement restrictions.

Referring to the FIG. 12, a method 1200 is a flowchart for handover preparation by the LTE-A non ICIC eNB 102 as a target eNB. The target eNB 102 receives a Handover Preparation Command which is illustrated in the FIG. 10 from the source eNB at step 1202. The target eNB 102 reserves radio resources for the UE 106 and generate a Handover Command at step 1204. If the UE 106 is configured with the time domain measurement restrictions at step 1206, the target eNB 102 sets measSubframePatternConfigNeigh to release in the measObject of the target primary frequency, source primary frequency or any EUTRA frequency at step 1208. At step 1210, the target eNB 102 sends the handover command back to the source eNB. The method above can be applied to the other release 10 feature not supported by the LTE-A target eNB than the time domain measurement restriction.

A number of embodiments of the invention have been described. Nevertheless, it will be understood that various modifications may be made without departing from the spirit and scope of the invention. For example, when the source eNB knows that the target eNB is Release 8/9, the source eNB may release the measurement resource restrictions by adding measurement configuration information element to the handover command prepared by the target eNB before the command is transmitted to the UE. Accordingly, other embodiments are within the scope of the following claims.

What is claimed is:
1. A method, comprising:
   setting a value of a MeasObjectEUTRA information element measSubframePatternConfigNeigh to Need OR;
   identifying handover from a source eNodeB (eNB) to a target eNB or reestablishment with a subsequent eNB after losing connection with an initial eNB;
   determining wireless communication in connection with the handover or the reestablishment does not include the measSubframePatternConfigNeigh information element;
   identifying time-domain measurement resource restrictions for a user equipment (UE); and
   in response to the determining, releasing the time-domain measurement resource restriction for the UE in connection with identifying the handover or the reestablishment.

2. The method of claim 1, wherein releasing the time-domain measurement resource restriction comprises automatically releasing the time-domain measurement resource restriction in response to the handover or the reestablishment.

3. The method of claim 1, wherein releasing the time-domain measurement resource restriction comprises releasing the time-domain measurement resource restriction for neighbor cells for at least one of a target primary frequency, a source primary frequency, an initial primary frequency, a subsequent primary frequency, any EUTRAN frequency, or a predetermined or preconfigured frequency.

4. User Equipment (UE), comprising:
   one or more processors configured to:
      set a value of a MeasObjectEUTRA information element measSubframePatternConfigNeigh to Need OR;
      identify handover from a source eNodeB (eNB) to a target eNB or reestablishment with a subsequent eNB after losing connection with an initial eNB;
      determine wireless communication in connection with the handover or the reestablishment does not include the measSubframePatternConfigNeigh information element;
      identify time-domain measurement resource restrictions for a UE; and in response to the determination, release the time-domain measurement resource restriction for a UE based in connection with identifying the handover or the reestablishment.

5. The UE of claim 4, wherein the one or more processors configured to release the time-domain measurement resource restriction comprise one or more processors configured to automatically release the time-domain measurement resource restriction in response to the handover or the reestablishment.

6. The UE of claim 4, wherein the one or more processors configured to release the time-domain measurement resource restriction comprise one or more processors configured to release the time-domain measurement resource restriction for neighbor cells for at least one of a target primary frequency, a source primary frequency, an initial primary frequency, a subsequent primary frequency, any EUTRAN frequency, or a predetermined or preconfigured frequency.

7. A computer program product encoded on a non-transitory, tangible storage medium, the product comprising computer readable instructions for causing at least one processor to perform operations comprising:
setting a value of a MeasObjectEUTRA information element measSubframePatternConfigNeigh to Need OR;
identifying handover from a source eNodeB (eNB) to a target eNB or reestablishment with a subsequent eNB after losing connection with an initial eNB;
determining wireless communication in connection with the handover or the reestablishment does not include the measSubframePatternConfigNeigh information element;
identifying time-domain measurement resource restrictions for a user equipment (UE); and
in response to the determining, releasing the time-domain measurement resource restriction for the UE in connection with identifying the handover or the reestablishment.

8. The computer program product of claim 7, wherein the operations comprising releasing the time-domain measurement resource restriction includes operations comprising automatically releasing the time-domain measurement resource restriction in response to the handover or the reestablishment.

9. The computer program product of claim 7, wherein the operations comprising releasing the time-domain measurement resource restriction include operations comprising releasing the time-domain measurement resource restriction for neighbor cells for at least one of a target primary frequency, a source primary frequency, an initial primary frequency, a subsequent primary frequency, any EUTRAN frequency, or a predetermined or preconfigured frequency.

10. A method, comprising:
transmitting, to a UE, instructions to set a value of a MeasObjectEUTRA information element measSubframePatternConfigNeigh to Need OR;
identifying, by a source eNB, a handover to a target eNB;
identifying time-domain measurement resource restrictions for the UE; and
transmitting, by the source eNB, a handover command with a measSubframePatternConfigNeigh information element to the UE to maintain the time-domain measurement resource restriction for the UE based on the handover.

11. The method of claim 10, further comprising:
transmitting a request to the target eNB for information identifying a type of network; and
determining the target eNB is serviced by a Long Term Evolution (LTE) network based on a response from the target eNB, wherein the handover command indicates the target eNB is serviced by the LTE network.

12. The method of claim 11, wherein the request is transmitted using an X2 interface or an operating and management (OAM) system.

13. The method of claim 10, wherein the handover command indicates maintaining the time-domain measurement resource restriction for neighbor cells for at least one of a target primary frequency, a source primary frequency, or any EUTRAN frequency.

14. The method of claim 10, wherein the handover command includes a measSubframePatternConfigNeigh information element (IE) set, by the target eNB, to release a target primary frequency, a source primary frequency, or any Evolved Universal Terrestrial Radio Access (EUTRA) frequency, the method further comprising transmitting the handover command to the UE.

15. A source eNB, comprising:
one or more processors configured to:
transmit, to a UE, instructions to set a value of a MeasObjectEUTRA information element measSubframePatternConfigNeigh to Need OR;
identify, by a source eNB, a handover to a target eNB;
identify time-domain measurement resource restrictions for the UE; and
transmit, by the source eNB, a handover command with a measSubframePatternConfigNeigh information element to the UE to maintain the time-domain measurement resource restriction for the UE based on the handover.

16. The eNB of claim 15, the processors further configured to:
transmit a request to the target eNB for information identifying a type of network; and
determine the target eNB is serviced by an LTE network based on a response from the target eNB.

17. The eNB of claim 16, wherein the request is transmitted using an X2 interface or an operating and management (OAM) system.

18. The eNB of claim 15, wherein the handover command indicates maintaining the time-domain measurement resource restriction for neighbor cells for at least one of a target primary frequency, a source primary frequency, or any EUTRAN frequency.

19. The eNB of claim 15, wherein the handover command includes a measSubframePatternConfigNeigh information element (IE) set, by the target eNB, to release a target primary frequency, a source primary frequency, or any EUTRA frequency, the one or more processors further configured to transmit the handover command to the UE.

20. A computer program product encoded on a non-transitory, tangible storage medium, the product comprising computer readable instructions for causing at least one processor to perform operations comprising:
transmit, to a UE, to a UE, instructions to set a value of a MeasObjectEUTRA information element measSubframePatternConfigNeigh to Need OR;
identifying, by a source eNB, a handover to a target eNB;
identifying time-domain measurement resource restrictions for the UE; and
transmitting, by the source eNB, a handover command with a measSubframePatternConfigNeigh information element to the UE to maintain the time-domain measurement resource restriction for the UE based on the handover.

21. The computer program product of claim 20, the instructions for causing at least one processor to perform operations further comprising:
  transmitting a request to the target eNB for information identifying a type of network; and
  determining the target eNB is serviced by an LTE network based on a response from the target eNB.

22. The computer program product of claim 21, wherein the request is transmitted using an X2 interface or an operating and management (OAM) system.

23. The computer program product of claim 20, wherein the handover command indicates maintaining the time-domain measurement resource restriction for neighbor cells for at least one of a target primary frequency, a source primary frequency, or any EUTRAN frequency.

24. The computer program product of claim 20, wherein the handover command includes a measSubframePattern-ConfigNeigh information element (IE) set, by the target eNB, to release a target primary frequency, a source primary frequency, or any EUTRA frequency, the instructions further comprising transmitting the handover command to the UE.

* * * * *